United States Patent

[11] 3,536,179

[72] Inventor Reinhold A. Pearson
E. 304 2nd Ave, Spokane, Washington 99202
[21] Appl. No. 814,650
[22] Filed April 9, 1969
[45] Patented Oct. 27, 1970

[54] GATE MEANS FOR CARTON-LOADING APPARATUS
9 Claims, 4 Drawing Figs.

[52] U.S. Cl. .................................................... 198/26, 198/32, 198/34
[51] Int. Cl. .................................................... B65g 47/08, B65g 47/26

[50] Field of Search ................................. 198/26, 32, 34; 141/165, 180, 269

[56] References Cited
UNITED STATES PATENTS
2,587,959  3/1952  Biner ........................... 198/32

Primary Examiner—Edward A. Sroka
Attorney—Wells & St. John

ABSTRACT: A gate means is disclosed for intermittently stopping the flow of cans on a moving conveyor line to permit the transverse movement of cans that have passed through the gate means without interference by the succeeding cans.

INVENTOR.
REINHOLD A. PEARSON
BY Wells & St. John

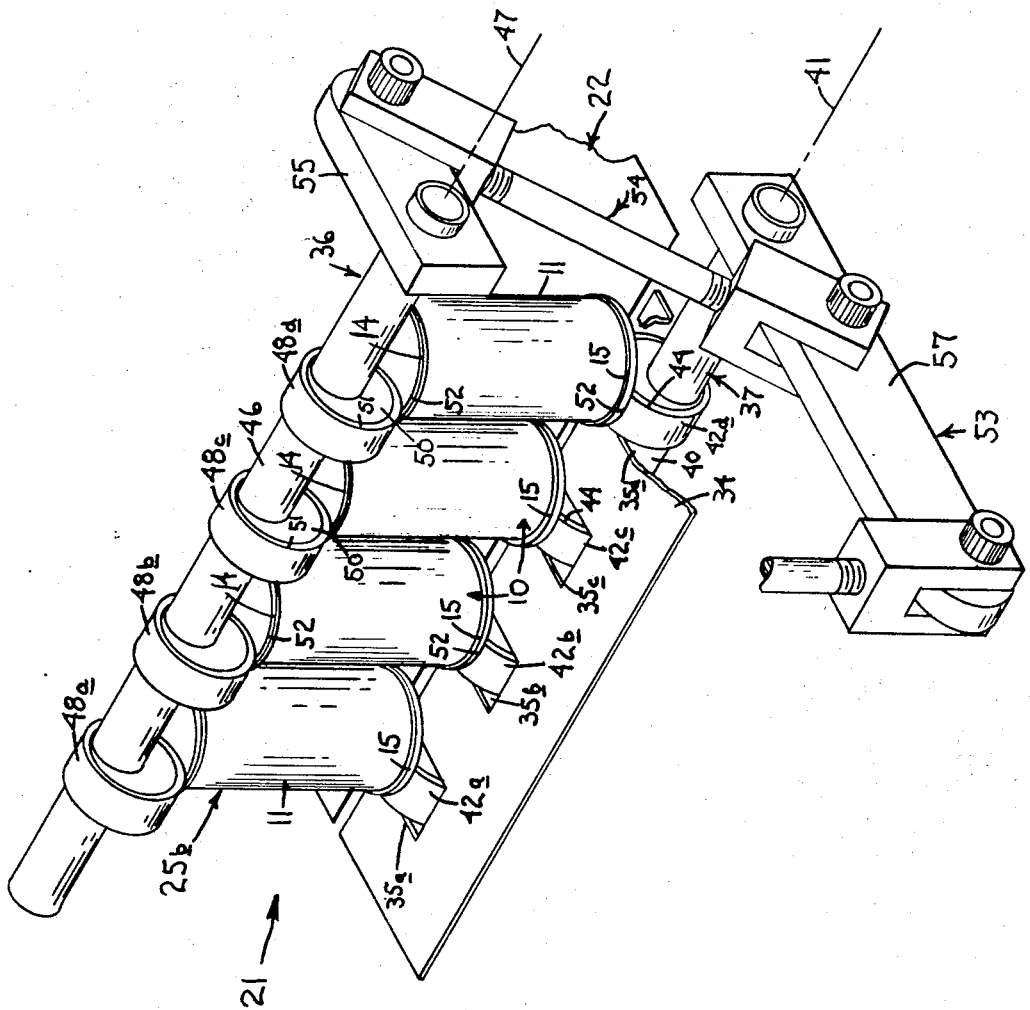

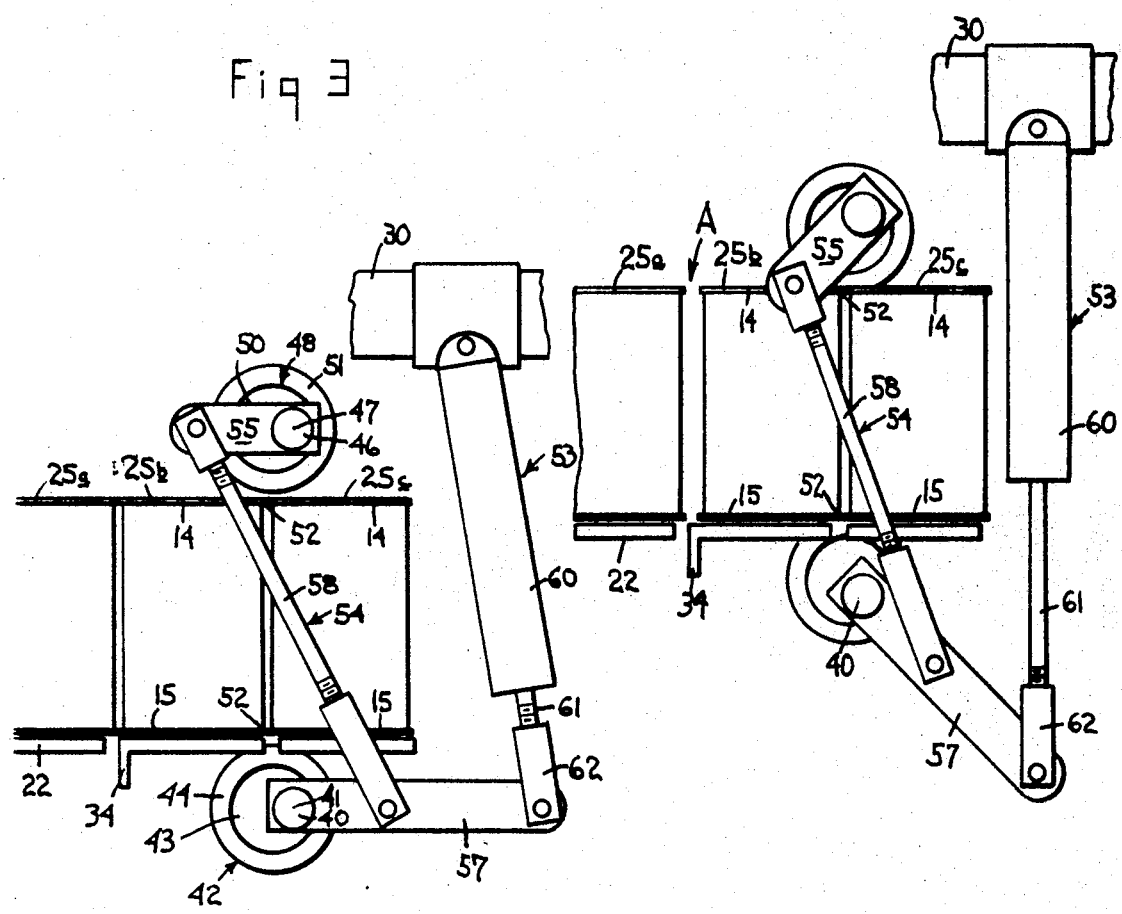

GATE MEANS FOR CARTON-LOADING APPARATUS

BACKGROUND OF THE INVENTION

This invention relates to carton-loading apparatus and more particularly to gate means for intermittently stopping the flow of articles on a moving conveyor line.

One of the significant problems with much of the automatic carton-loading equipment that is being used in beverage and can goods industries is the ability to handle the beverage containers or canned goods fast enough to keep up with the high-speed filling lines. The carton-loading equipment frequently seriously restricts the production capability of a beverage plant. Frequently several carton-loading lines must be utilized to handle the production from a single filling line.

During the loading of the cartons it is often desirable to align the articles into one or more rows and then to remove the articles from the rows in groups for loading each carton all at once. Commonly six, 12, 24 or 48 articles are loaded as a group into cartons for shipping. Soda pop and beer containers generally are grouped into three rows of four each to make a load of 12 (half case) or into four rows of six each to make a 24-carton load (full case).

In presently used equipment often the feeding of the articles to the loading station must be stopped while a load of articles is being loaded into the cartons. This is frequently accomplished by intermittently stopping the feed conveyor line.

U.S. Pat. application Ser. No. 681,824 discloses carton-loading apparatus for removing a carton load at a time of articles from a feed conveyor and loading the articles into cartons by shifting the articles transversely to the side of the feed conveyor. Instead of periodically stopping and starting the feed conveyor to diminish the back pressure exerted by the succeeding articles, the front rank of the succeeding articles are engaged and moved backward a slight distance as a preceding load of articles is being shifted transversely to the feeding direction. An article holding and separating device is provided at the front of the feed conveyor to stop the movement of the succeeding articles and to separate the succeeding articles from the load of articles being shifted to the side.

This application is concerned with an improvement with such an article holding and separating device by forming a gate means for engaging and holding the front rank of the succeeding articles while the preceding load of articles is being transversely moved to a loading station without interference from the succeeding articles.

One of the principal objects of this invention is to provide a gate means at the front of the feed conveyor for engaging the front rank of articles with considerable precision and stopping the front rank from moving forward to interfere with the movement of the preceding articles without damaging the articles.

An additional object of this invention is to provide a gate means having resilient engaging means for engaging both the top and bottom of the articles and gripping the articles therebetween to prevent forward movement of the front rank of articles.

A further object of this invention is to provide gate means for engaging the articles from the top and the bottom and moving the front rank rearward a slight distance to provide a space between the front rank and the preceding articles.

An additional object of this invention is to provide an improvement to the article holding and separating device described in the U.S. Pat. application Ser. No. 681,824.

These and other objects and advantages of this invention will become apparent upon reading the following detailed description of a preferred embodiment.

BRIEF DESCRIPTION OF THE DRAWINGS

A preferred embodiment of this invention is illustrated in the drawings in which:

FIG. 2 is a fragmentary perspective view of the gate means showing upper and lower eccentric cam elements for gripping and holding the front rank of cans;

FIG. 3 is an illustrated side view of the gate means showing the gate means with the eccentric cam elements in the nonengaging position; and FIG. 4 is a view similar to FIG. 3 except showing an eccentric cam element engaging the rim of the front rank of cans and moving the front rank rearward a small distance.

DETAILED DESCRIPTION OF A PREFERRED EMBODIMENT

Figure 1:
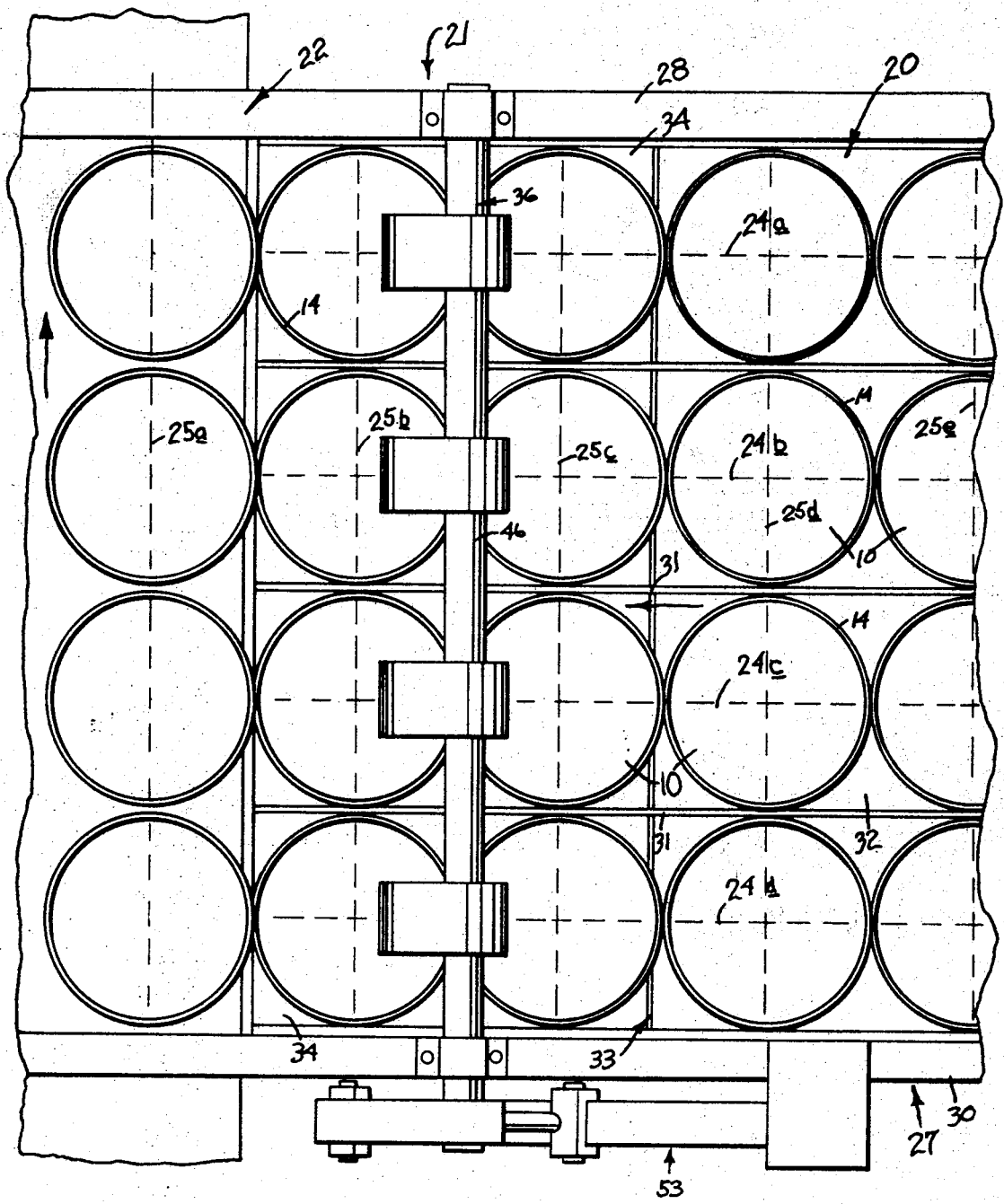
FIG. 1 is a fragmentary plan view of carton loading equipment including a feed conveyor for feeding cans forward in four rows with a gate means embodying the principles of this invention mounted at the front of the feed conveyor for preventing further movement of a front rank of cans while the preceding cans are being moved laterally.

The specific embodiment shown in the drawings is concerned with the handling of containers such as tin cans 10 that have a cylindrical wall 11 with enclosing top and bottom ends sealed by an upper rim 14 and a lower rim 15. Each rim has a cylindrical chime to prevent the cylindrical walls from rubbing together during the handling process.

A portion of a carton-loading apparatus is shown in FIG. 1 with gate means 21 mounted at the front end of a feed conveyor 20. The feed conveyor 20 moves the cans in a longitudinal direction in a plurality of rows 24 which, for illustration purposes, are individually indentified as 24a, 24b, 24c and 24d. The apparatus as shown is specifically designed for use in conjunction with loading four rows of six cans in a 24-case carton. The cans are transversely aligned in ranks 25. The five ranks, shown in FIG. 1, are individually indentified as ranks 25a, 25b, 25c, 25d and 25e. Rank 25a has passed through the gate means 21 and is resting on transverse conveying means 22 in preparation to be shifted transversely along with a number of other cans. Rank 25b is termed the front rank of the succeeding cans and is located at the gate means 21.

The transverse conveyor 22 is mounted in front of the gate means for moving the cans that pass through the gate means in a transverse direction to a loading station. An example of such a loading station is illustrated in the copending U.S. Pat. application Ser. No. 681,824.

The feed conveyor 20 has a frame 27 with sides 28 and 30 parallel with the longitudinal direction of the conveyor. A plurality of dividers 31 are transversely spaced between the sides 28 and 30 for dividing a continuously moving conveyor surface 32 into four equal areas to form the rows 24. The conveying surface 32 may be a continuous belt conveyor or the like which terminates at a front end 33.

The gate means includes a transverse support plate 34 mounted on the frame 27 immediately in front of the conveying surface 32 for receiving cans 10 therefrom that are fed from the feed conveyor. A plurality of rectangular apertures 35 (FIG. 2) are formed in the front plate aligned with the rows and individually identified by 35a, 35b, 35c and 35d. The gate means further includes an upper eccentric cam means 36 and a lower eccentric cam means 37 (FIGS. 2—4) for engaging the front rank 25b of cans supported on the plate 34.

The lower eccentric cam means 37 includes a lower shaft 40 that is rotatably mounted on the frame 27 for rotational movement about a transverse axis 41 which is below the support plate 34 and path of the cans and is perpendicular to the longitudinal movement of the cans on the feed conveyor 22. A plurality of eccentric cams 42 are fixed to the shaft 40 at spaced intervals for projecting through the apertures 35 to engage the bottoms of the cans. The eccentric cams are identified individually as 42a, 42b, 42c and 42d, and are aligned with the corresponding rows. Each of the eccentric cams 42 has a lobe 43 (FIG. 3) that engages the bottom rim of the cans when the shaft 40 is rotated from a nonengaging position (FIG. 3) to an engaging position (FIG. 4). Each of the eccentric cams has a resilient layer 44 formed thereon of polyurethane.

The upper eccentric cam means 36 includes an upper shaft 46 that is rotatably mounted on the frame 27 for rotatable movement about a transverse axis 47 which is above the path of the cans and vertically aligned with the transverse axis 41. A plurality of eccentric cams 48 are affixed on the shaft at spaced intervals vertically aligned with corresponding cams 42 for engaging the top rims of the cans when the shaft 46 is rotated. Cams 48 are individually identified as 48a, 48b, 48c and 48d. Each of the cams 48 has a lobe 50 for engaging the top rims of the cans. A resilient layer 51 of polyurethane is formed on the cams for providing resilient engagement with the tops of the cans.

The transverse axes 41 and 47 are longitudinally positioned so that the lobes 43 and 50 of eccentric cam means engage the rims 14 and 15 respectively at their rearmost point 52.

A drive means 53 is operatively connected to the shafts 40 and 46 for pivoting the eccentric cams from the nonengaging position shown in FIG. 3 to an engaging position shown in FIG. 4, with the lobes of the cams engaging and gripping the cans at the rims 14 and 15 at the rearmost point 52. The drive means includes a linkage 54 having a radial arm 55 extending in one direction outward from one end of the shaft 40. A longer radial arm 57 extends in the opposite direction outward from the shaft 46. A link connection 58 interconnects the arms 55 and 57 so that the shafts are pivoted simultaneously in opposite directions.

A pneumatic cylinder 60 is operatively connected to the outer end of the radial arm 57 through a piston rod 61 and a split clevis 62. In this specific configuration the pneumatic cylinder is mounted to the side frame 30 so that when the piston rod is in the retracted position, the eccentric cams 42 and 48 are in the nonengaging position shown in FIG. 3. When the piston rod 61 is extended, the shafts 40 and 46 are rotated in opposite directions to move the lobes with their resilient layers into engagement of the rims of the front rank of cans to prevent further forward movement of the front rank and subsequent ranks. The full stroke of the piston rod 61 pivots the lobes sufficiently to move the front rank of cans a slight distance rearward to provide the space A, as shown in FIG. 4 between the front rank of the cans 25b on the support plate 34 and the preceding rank 25a so that when the preceding cans, including the rank 25a are moved transversely, there will be no interference by the succeeding cans and the chimes of the rank of cans 25b will not interfere or scrape the preceding cans. The resilient layers 44 and 51 on the cams enables the lobes to move in an arc to move the front rank of cans rearward while maintaining gripping control of the cans.

I claim:

1. Gate means for intermittently engaging and gripping a front rank of upright articles being fed forward in a prescribed path by a feed conveyor; said gate means comprisng:
   a. a frame;
   b. a support means for supporting the front rank of articles, said support means having openings therein to provide access to the bottom of the front rank of articles;
   c. a first engaging means mounted on the frame for pivotal movement about a transverse axis below the path between a nonengaging position out of the path of the articles and an engaging position projected through the openings engaging the bottoms of the front rank of articles;
   d. a second engaging means mounted on the frame above the first eccentric cam means for pivotal movement about a transverse axis above the path for movement between a nonengaging position out of the path of the articles and an engaging position engaging the tops of the front rank of articles; and
   e. drive means operatively connected to the first and second engaging means for intermittently and simultaneously pivoting said engaging means from the nonengaging positions to the engaging positions to grip the front rank of articles therebetween to prevent forward movement of same.

2. The gate means as defined in claim 1 wherein the first engaging means includes a shaft mounted for rotation about the lower transverse axis and a plurality of eccentric cams fixed to and spaced along the shaft for projecting through the openings to engage the bottom of the front rank of articles when the shaft is rotated.

3. The gate means as defined in claim 2 wherein the eccentric cams have lobe surfaces that are resilient for engaging the articles without causing damage thereto.

4. The gate means as defined in claim 1 wherein the second engaging means includes a shaft mounted for rotation about the upper transverse axis and a plurality of eccentric cams affixed and spaced along the shaft for engaging the top of the front rank of articles when the shaft is rotated.

5. Gate means for intermittently engaging, gripping and moving rearward a front rank of upright cans that are being fed forward in rows by a feed conveyor, said gate means comprising;
   a. a frame;
   b. support means mounted on the frame for receiving and supporting the front rank of cans, said support means having openings therein beneath the front rank of cans;
   c. a first set of eccentric cams mounted beneath the support means for pivotal movement about a lower transverse axis between a nonengaging position and an engaging position projecting through the openings and engaging the bottoms of the front rank of cans;
   d. a second set of eccentric cams mounted above the support means for pivotal movement about an upper transverse axis between a nonengaging position and an engaging position engaging the top of the front rank of cans; and
   e. drive means operatively connected to the first and second set of eccentric cams for intermittently and simultaneously pivoting said cams from the nonengaging positions to the engaging positions to grasp the front rank of cans therebetween to prevent the further forward movement of the cans and to move the front rank of cans rearward a small distance.

6. The gate means as defined in claim 5 wherein the cans have bottom and top rims and wherein the cams have lobes that engage the can rims when the cans are pivoted to the engaging positions.

7. The gate means as defined in claim 6 wherein the cams are positioned so that the lobes engage the most rearward portion of the rims.

8. The gate means as defined in claim 5 wherein the drive means pivots the first and second set of cams in opposite directions counter to the feed conveyor.

9. The gate means as defined in claim 6 wherein the surfaces of the lobes are resilient.